United States Patent [19]
Vos

[11] Patent Number: 5,615,606
[45] Date of Patent: Apr. 1, 1997

[54] CONVEYOR

[75] Inventor: Peter M. Vos, Malaga, Australia

[73] Assignee: Vos Industries Pty. Ltd., Australia

[21] Appl. No.: 667,361

[22] Filed: Jun. 21, 1996

Related U.S. Application Data

[62] Division of Ser. No. 244,990, filed as PCT/AU92/00671, Dec. 18, 1992, abandoned.

[30] Foreign Application Priority Data

Dec. 20, 1991 [AU] Australia ................... PL 0132

[51] Int. Cl.$^6$ ............... A21B 5/08; A23L 1/01; A47J 27/14; A47J 37/12
[52] U.S. Cl. ............... 99/352; 99/345; 99/404; 99/407; 99/443 C; 99/450; 99/516; 198/404; 198/406; 198/813; 198/816
[58] Field of Search ............... 99/330, 339, 340, 99/345–347, 403–409, 410–417, 443 R, 443 C, 386, 450, 477–479, 516, 534–536, 352–355; 198/394, 396, 406, 408, 410, 443, 839, 842, 813, 816; 134/124, 131, 129, 144

[56] References Cited

U.S. PATENT DOCUMENTS

| | | | |
|---|---|---|---|
| 1,148,005 | 7/1915 | Bogdanffy | 198/404 |
| 2,591,609 | 4/1952 | Roberts et al. | 198/816 |
| 2,709,412 | 5/1955 | Eagerman | 107/57 |
| 3,593,591 | 7/1971 | Chantland | 198/813 |
| 3,625,341 | 12/1971 | Kretzschmar et al. | 198/842 |
| 4,491,602 | 1/1985 | Miller | 99/404 X |
| 4,511,028 | 4/1985 | Meister | 198/816 |
| 4,688,476 | 8/1987 | Zittel | 99/403 |
| 4,898,092 | 2/1990 | Greer | 99/516 X |
| 4,942,810 | 7/1990 | Zittel et al. | 99/443 C |
| 5,066,505 | 11/1991 | Vos et al. | 99/404 X |
| 5,077,072 | 12/1991 | Sieradzki | 99/443 C |
| 5,133,249 | 7/1992 | Zittel | 99/348 |
| 5,179,890 | 1/1993 | Reuveni et al. | 99/443 C |
| 5,351,607 | 10/1994 | Rini et al. | 99/404 |
| 5,427,016 | 6/1995 | Dunckel | 99/352 |
| 5,483,871 | 1/1996 | Kirk et al. | 99/534 X |

FOREIGN PATENT DOCUMENTS

| | | | |
|---|---|---|---|
| 759876 | 3/1953 | Germany | 198/406 |
| 1095223 | 12/1960 | Germany. | |
| 49407 | 7/1994 | Japan | 198/816 |
| 1487591 | 10/1977 | United Kingdom. | |
| 1562590 | 3/1980 | United Kingdom. | |

*Primary Examiner*—Timothy F. Simone
*Attorney, Agent, or Firm*—Westman, Champlin & Kelly, P.A.

[57] ABSTRACT

A conveyor apparatus including dips to turn and tumble items placed on the conveyor. The conveyor apparatus has a conveyor belt configured in a series of dips arranged to insure the turning and tumbling of items placed on the conveyor belt.

7 Claims, 5 Drawing Sheets

CONVEYOR

This is a divisional of application Ser. No. 08/244,990, filed as PCT/AU92/00671 Dec. 18, 1992, abandoned.

DESCRIPTION

The present invention relates to a conveyor.

FIELD OF INVENTION

The apparatus of the present invention has been developed in association with a method for cooking food. Conveyors currently used, particularly in the food industry are unable to turn and tumble products. To achieve this result current methods require the use of two seperate conveyor belts and conveyors being placed at upper and lower levels to each other. The apparatus of the present invention provides a significant alternative to this method of conveying items. The conveyor apparatus comprising the present invention is arranged such that items may be placed on a single conveyor belt arranged with a series of dips so as is in use items tumble over the dip and are, in general, turned. This has a particular benefit to food products as it enables them to be cooked more evenly and quickly.

SUMMARY OF THE INVENTION

In accordance with one aspect of the present invention there is provided a conveyor comprising a conveyor belt means, first and second end parts of said conveyor, said conveyor belt means positioned between said first and second end parts, a portion of said conveyor belt means between said first and second end parts arranged to convey items, wherein said portion comprises at least one dip in said conveyor belt means such that in use, at the said dip said items fall to a lower level of said conveyor belt means.

DESCRIPTION OF THE INVENTION

Figure 1A:
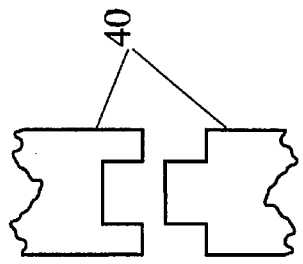
FIG. 1A is an exploded view of the male and female drive coupling which mat form part of the end roller and drive shaft to impart drive to the conveyor.

The following description is given by way of example only in embodiments of the conveyor apparatus of the present invention. In FIGS. 1 to 4, there is shown a conveyor 10 comprising a conveyor belt 12 positioned between first and second end parts 14 and 16, respectively, of the conveyor 10. The conveyor belt 12 is of the endless type and passes around and extends between a first end roller 18 and a second end roller 20, in looplike manner.

The first end roller 18 is positioned in the region of the first end part 14 of the conveyor 10. The second end roller 20 is positioned in the region of the second end part 16 of the conveyor 10. These rollers 18 & 20 may be fixed in such a way so as to provide a tensioning arrangement for the conveyor belt 12 by adjusting the position at which they are attached to the side frame members 38.

The conveyor belt 12 has an upper track portion 22 and a lower track portion 24. This can be seen in FIG. 4. The upper track portion 22 of the conveyor belt 12 is able to convey items 26, as can been seen in FIG. 7.

Figure 1:
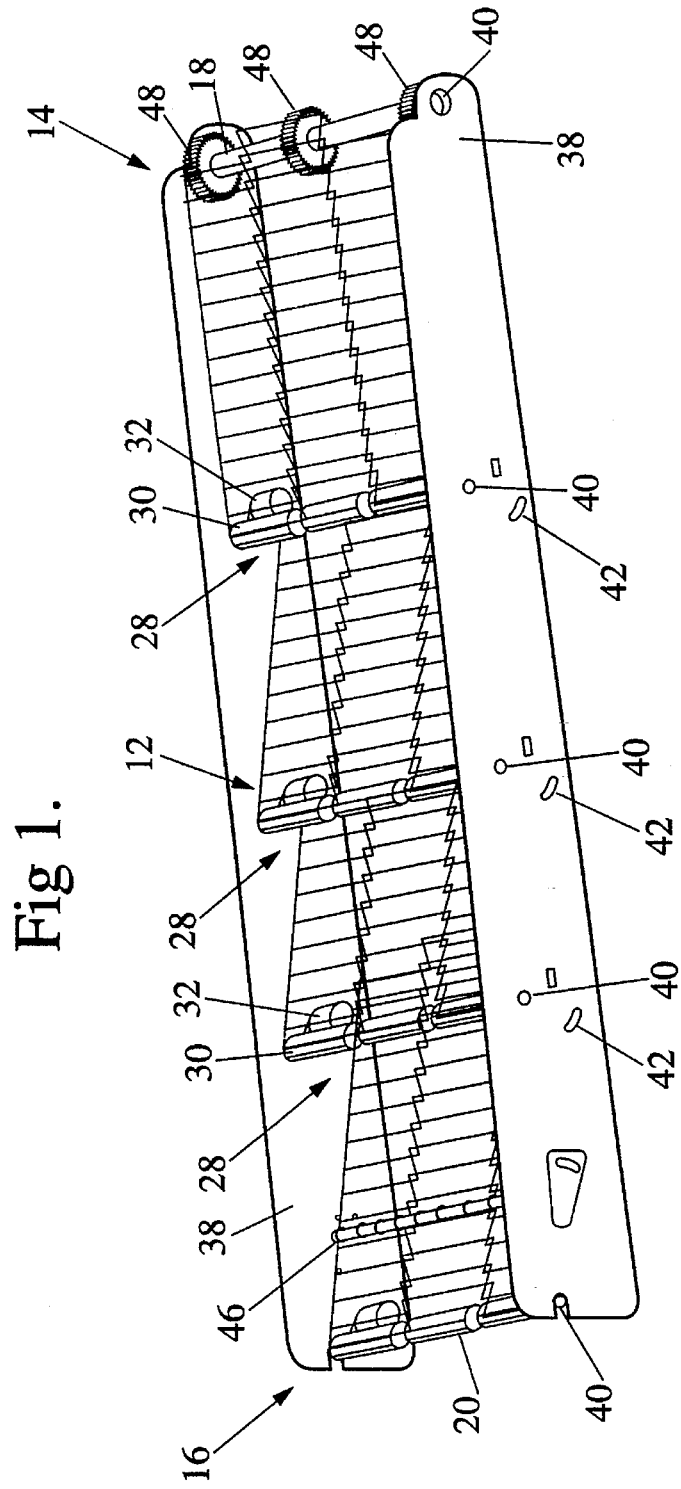
FIG. 1 is an upper perspective view of an embodiment of a conveyor in accordance with the present invention.
Figure 2:
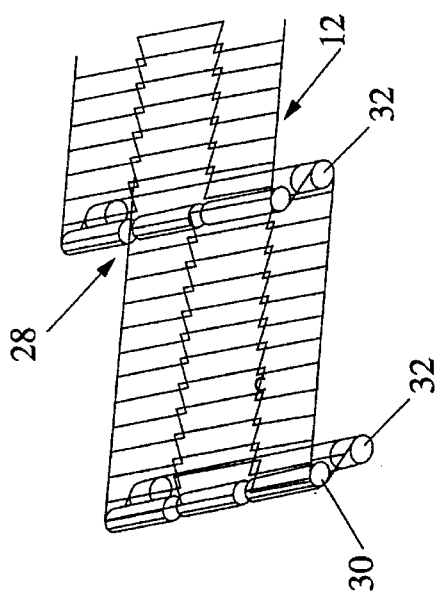
FIG. 2 is a detail of a portion of the conveyor shown in FIG. 1.
Figure 4:
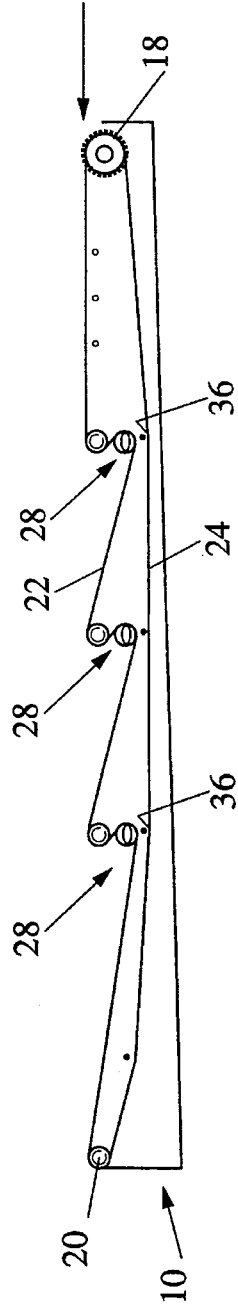
FIG. 4 is a side view of the conveyor shown in FIG. 1.

The upper track portion 22 of the conveyor belt 12 is provided with one or more dips 28. In FIGS. 1 and 4, the conveyor belt 12 is shown as provided with three dips 28. Each dip 28 is formed by the conveyor belt 12 passing over and around a first guide roller 30 and under and around a second guide roller 32.

The guide rollers 30 are positioned immediately beneath the horizontal line 34 (best seen in FIG. 6 and shown partly in broken lines) at which the upper track portion 22 of the conveyor 12 would be positioned if there were no dips 28 in the conveyor belt 12. The guide rollers 32 are positioned below respective guide rollers 30. At each dip 28, the conveyor belt 12 passes over and around each guide roller 30 and extends downwardly to pass under and around a guide roller 32. The conveyor belt 12 .extends upwardly from the guide roller 32 to the next guide roller 30. In this way, the guide rollers 30 and 32 guide the conveyor belt 12 from a first level to a second lower level at each dip 28. The conveyor belt 12 then extends upwardly to the next guide roller 30, as hereinabove described, which is also at the first level. This is best seen in FIG. 4.

Further guide rollers 36 may be positioned beneath the guide rollers 32 to keep the lower track portion 24 of the conveyor belt 12 out of contact with the guide rollers 32. The end rollers 18 and 20 and the guide rollers 30, 32 and 36 are rotatably mounted between a pair of side frame members 38 of the conveyor 10. For this purpose, the side frame members 38 are provided with holes or the like 40 so that the ends of the end rollers 18 and 20 and the guide rollers 30, 32 and 36 are retained therein.

Provision for adjusting the tension of the conveyor belt 12 may be incorporated into the conveyor 10.

The conveyor belt tensioning arrangement may be provided by mounting the ends of the guide rollers 32 in pairs of curved slots 42 in respective side frame members 38. In such a case, the curved slots 42 are provided in place of the holes 40 for mounting the guide rollers 32.

Figure 3:
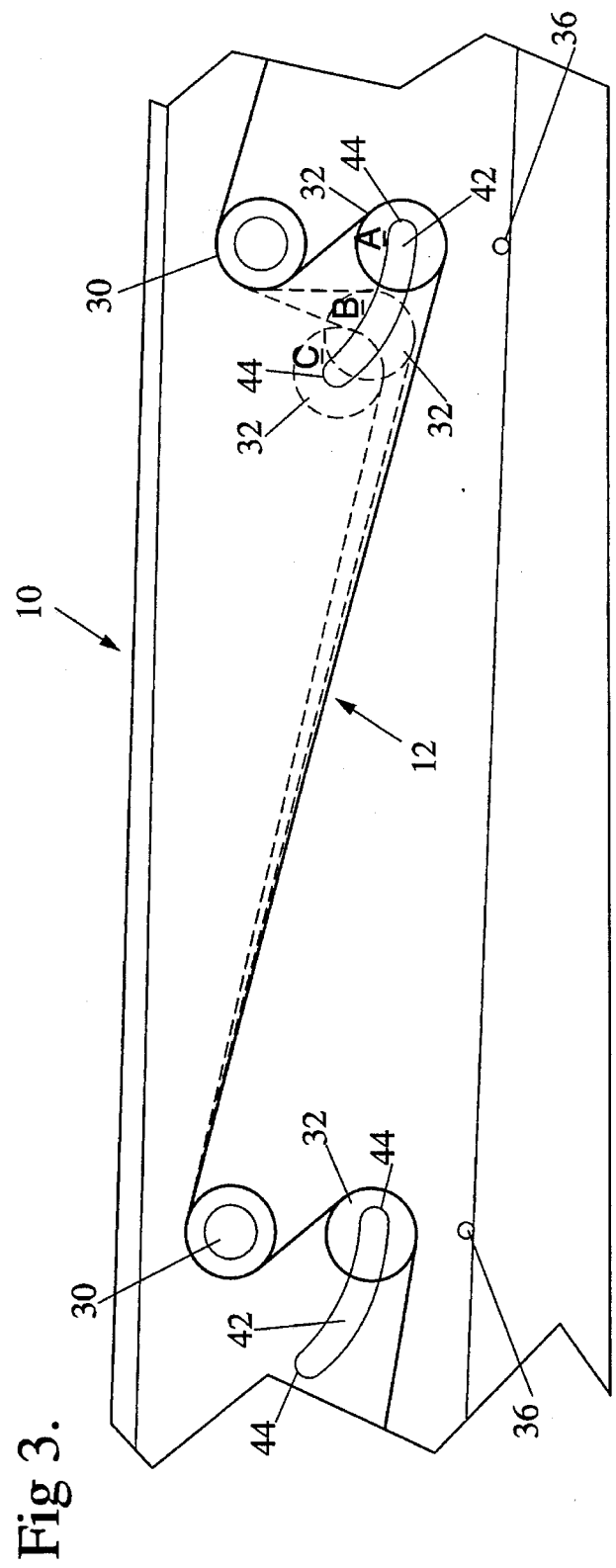
FIG. 3 is a side view of a portion of the conveyor shown in FIG. 1.

The curved slots 42 curve upwardly in a forward direction (i.e. in the direction of the second end part 16), as best seen in FIG. 3.

Each guide roller 32 is repositionable in its respective curved slots 42.

The guide rollers 32 can be locked into position at any required position between the ends 44 of their respective curved slots 42.

The guide roller 32 shown at the right in FIG. 3 imparts greatest tension to the conveyor belt 12 when it is in position A and least tension at position C. Position B is an intermediate position.

Accordingly, in the above described manner the guide rollers 32 may also act as tensioning rollers for the conveyor belt 12 i.e. guide/tension rollers 32. The conveyor 10 may also be provided with a wiper roller 46 to wipe excess fluid from the conveyor belt 12.

The conveyor 10 may be further provided with a drive mechanism. One such mechanism may use toothed wheels 48 to impart drive to the conveyor from a drive mechanism 101 (shown in FIG. 7) which does not form part of the present invention. Toothed wheels 48 may be provided on the end roller 18.

The conveyor belt 12 is of a form such that fluid can pass therethrough.

The conveyor belt 12 shown in the drawings is made of a grid-like mesh of interconnected wire, and readily enables fluid to pass therethrough.

Figure 5:
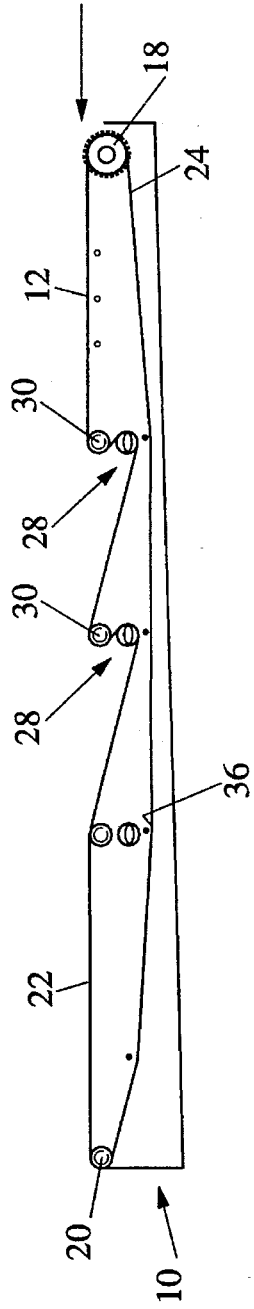
FIG. 5 is a side view of the conveyor shown in FIG. 1, but with the conveyor belt in a different arrangement.
Figure 6:
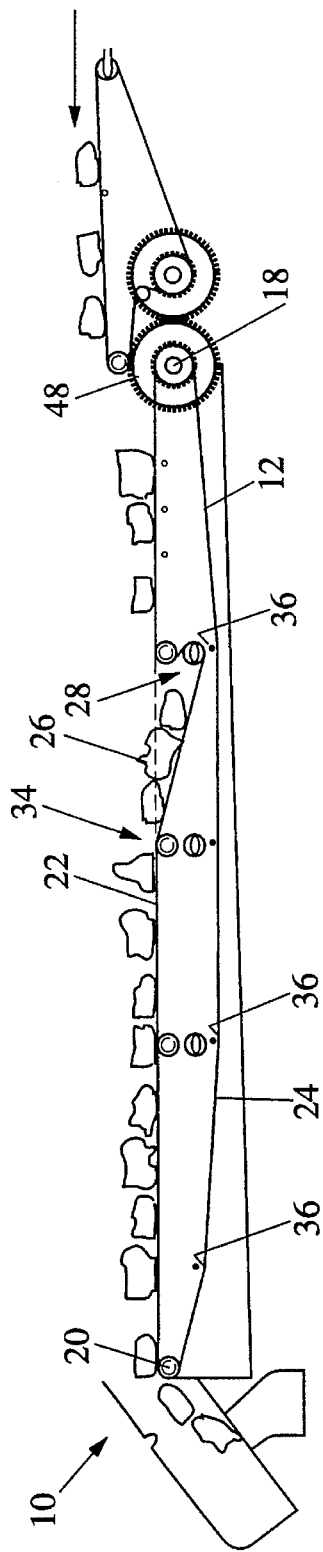
FIG. 6 is a further side view of the conveyor shown in FIG. 1, but with the conveyor belt in a further different arrangement.

FIG. 5 shows how the conveyor belt 12 may be provided with two dips 28, while in FIG. 6 the conveyor belt 12 has only one dip 28. Thus, any number of dips 28 may be provided depending upon the length of the conveyor 10 and the nature of the items 26 being conveyed.

Figure 7:
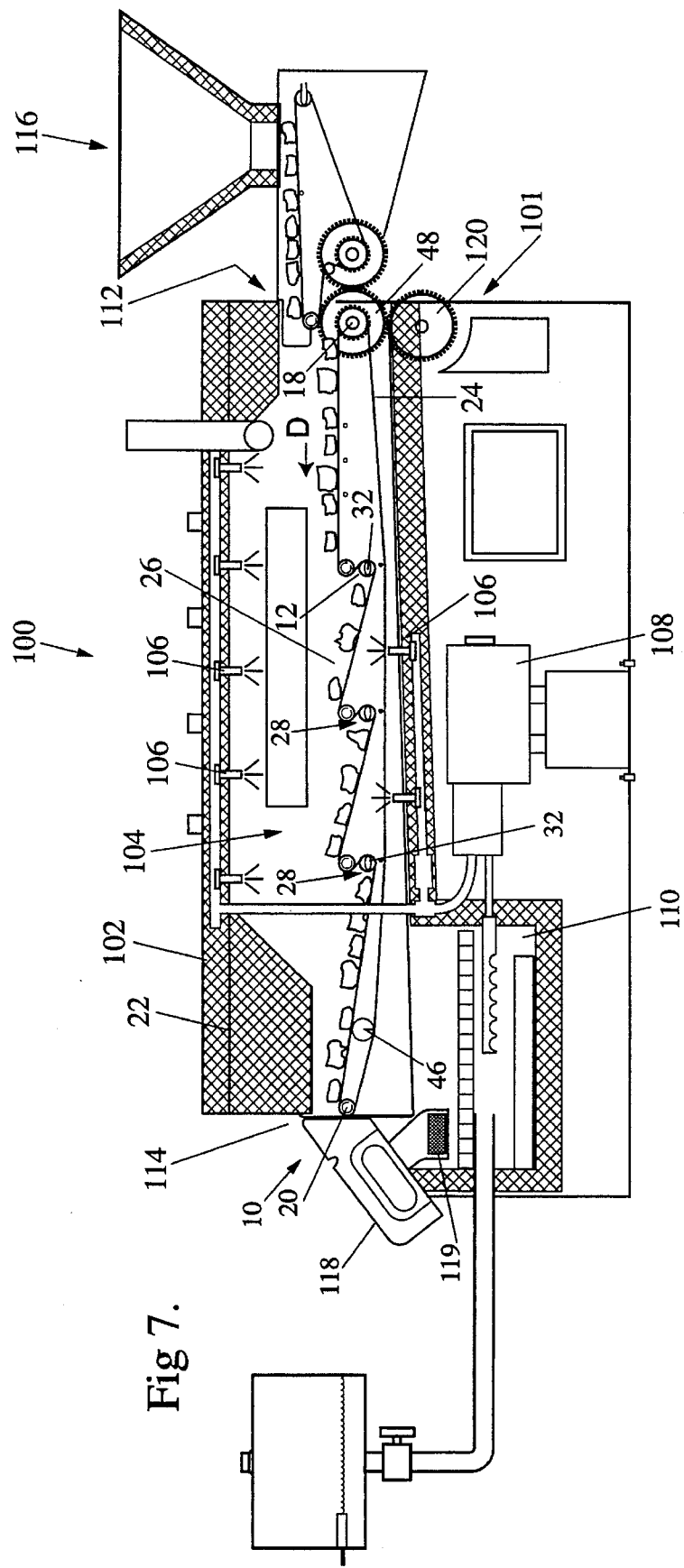
FIG. 7 is a sectional side view of a cooking apparatus with the conveyor shown in FIG. 1 in operative position therein; and, FIG. 8 is a perspective view of the cooking apparatus shown in FIG. 7.
Figure 8:
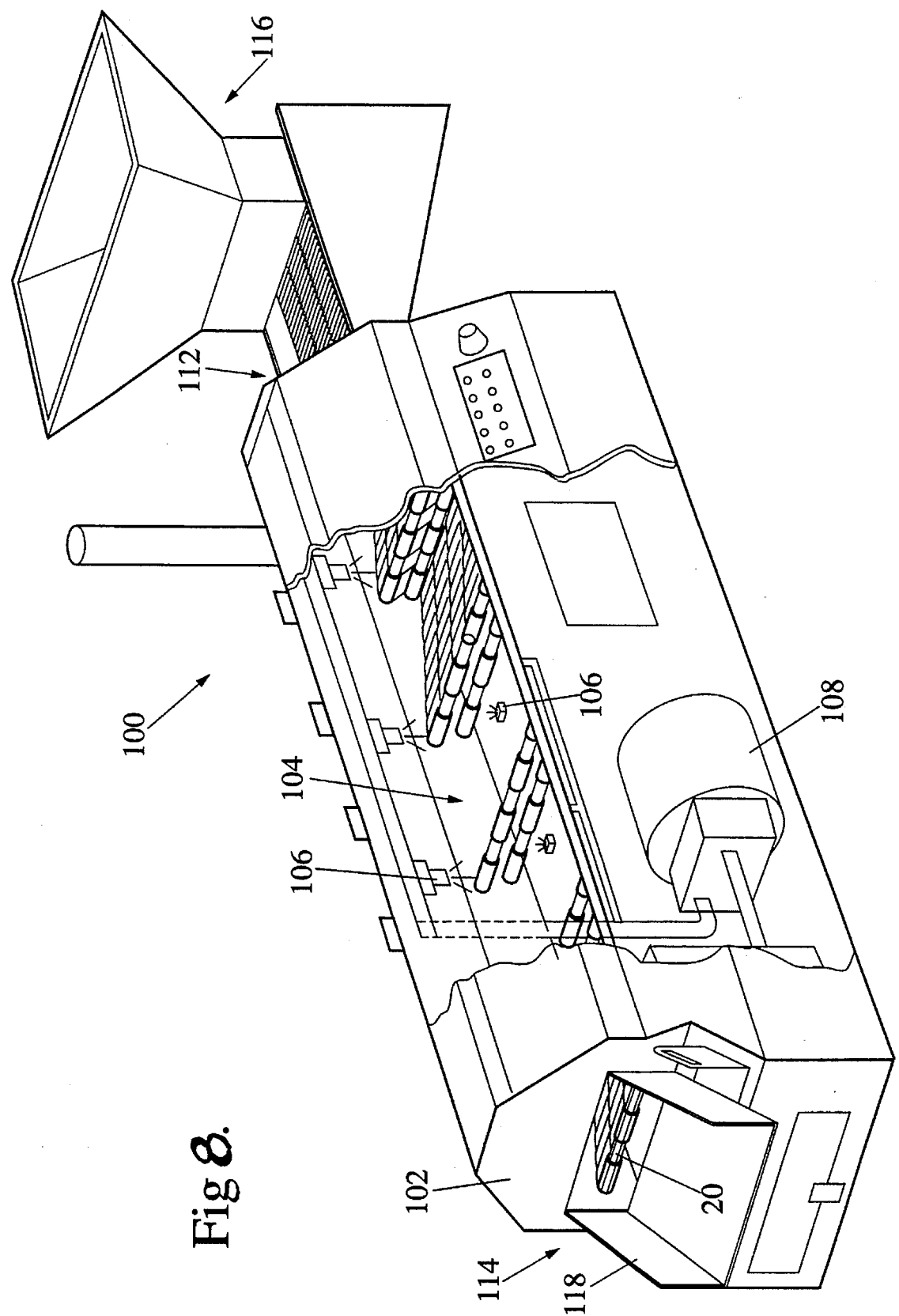

The conveyor 10 of the present invention may be used to convey food items 26 in a cooking apparatus 100 shown in FIGS. 7 and 8. However, the cooking apparatus 100 in its detail does not, itself, form part of the present invention.

The conveyor 10 is positioned in a housing 102 of the cooking apparatus 100 such that it conveys food through a cooking chamber 104. Spray nozzles 106 spray cooking fluid into the cooking chamber 104 to cook the food items 26 travelling on the conveyor belt 12. If desired, only the upper or lower set of spray nozzles 106 may be operated or provided. A pump assembly 108 pumps cooking fluid from a heating cooking fluid collector arrangement 110 to the spray nozzles 106. The sprayed cooking fluid is returned and reheated and then sprayed again.

The food items 26 enter at an inlet end 112 of the housing 102 and leave at an outlet end 114. The food items 26 may be loaded at the inlet end 112 by a loading sub-conveyor 116 and discharged at the outlet end 214 by a discharge chute 118, which incorporates a filter 119.

Toothed drive wheels or suitably fashioned sprockets 48 may be permantly attached to the end roller 18. Drive may then be imparted to the conveyor through the end roller 18 by locking one end of the end roller 18 into a suitable drive mechanism. In the present embodiment of the invention the end roller 18 has been designed so as to be easily detachable from the drive mechanism 101 by use of a male and female drive coupling 40'. The drive end of the first end roller 18 is configured so as to slide out from the drive shaft of the drive mechanism 101 so as to enable the conveyor 10 to be readily removed from the cooking chamber 104 for cleaning and servicing. Once the drive is applied to the front end roller 18, the upper track portion 22 of the conveyor belt 12 then moves in the direction shown by arrow D in FIG. 7. The food items 26 pass through the cooking chamber 104 on the upper track portion 22 of the conveyor belt 12 and are cooked by the cooking fluid being sprayed from the spray nozzles 108.

When the conveyor belt 12 passes over the guide roller 30 of a dip 28, any food items 28 at that part of the conveyor belt 12 fall onto the lower level of the conveyor belt 12 adjacent the guide tensioning roller 32 of that dip 28. The food items 26 then travel in an upwardly inclined manner to the next dip 28 and eventually to the second end part 18 of the conveyor 10.

The provision of the dips 28 means that the food items 26 undergo a tumbling like effect in their passage on the conveyor belt 12. This causes the orientation of the food items 28 on the conveyor belt 12 to be changed by the dips 28. This, in turn, provides more even and rapid cooking of the food items 28 since the outer surfaces of the food items are contacted from different angles by the cooking fluid being sprayed from the nozzles 106.

Modifications and variations such as would be apparent to a skilled addressee are deemed within the scope of the present invention.

I claim:

1. A spray cooking apparatus comprising:

a housing;

a cooking chamber located within said housing and having longitudinally spaced inlet and outlet ends;

a conveyor means to convey food to be cooked through said cooking chamber, said conveyor means having a substantially linear path of movement and longitudinally disposed between said inlet and outlet ends;

loading means to load food into said cooking chamber without entrainment of said food in a liquid;

spray means for delivering liquid cooking medium longitudinally disposed along the length of said cooking chamber, and for spraying said food with a cooking liquid as said food passes through said cooking chamber to cook said food; and wherein said conveyor means comprises a conveyor belt means, having a portion of said conveyor belt means arranged to convey items, wherein said portion comprises at least one dip in said conveyor belt means such that in use, at said dip, food items fall from a first level of the conveyor belt means to a lower level of said conveyor belt means, said conveyor belt means returning substantially to said first level after each said at least one dip.

2. A spray cooking apparatus as claimed in claim 1 wherein a plurality of dips are spaced along the length of said conveyor means.

3. A spray cooking apparatus as claimed in claim 1 wherein said conveyor belt means comprises a grid like mesh capable of allowing fluid to pass therethrough.

4. A spray cooking apparatus as claimed in claim 1 further wherein said conveyor means contains guide rollers positioned immediately beneath a horizontal line of the conveyor belt means for creating a dip, said guide rollers being mounted in curved slots to provide a tensioning device for the conveyor belt means.

5. A spray cooking apparatus as claimed in claim 1 further comprising a tensioning device positioned at least one of first and second end parts of the conveyor belt means.

6. A spray cooking apparatus as claimed in claim 5 wherein the conveyor means includes a male and female drive coupling for an end roller to attach to a positive drive mechanism fixed to the end roller thereby imparting the drive to the conveyor belt means.

7. A spray cooking apparatus comprising:

a housing;

a cooking chamber located within said housing and having longitudinally spaced inlet and outlet ends;

a conveyor means to convey food to be cooked through said cooking chamber, said conveyor means being substantially linear and longitudinally disposed between said inlet and outlet ends;

said conveyor means further comprising a grid like mesh capable of allowing liquid cooking medium to pass therethrough;

loading means to load food into said cooking chamber without entrainment of said food in a liquid;

spray means for delivering liquid cooking medium longitudinally disposed along the length of said cooking chamber, spraying said food with a cooking liquid as said food passes through said cooking chamber to cook said food;

means to collect excess cooking liquid for reuse in cooking of food; and wherein said conveyor means comprises a conveyor belt means, having a portion of said conveyor belt means arranged to convey items, wherein said portion comprises at least one dip in said conveyor belt means such that in use food items fall at said at least one dip from a first level of the conveyor belt means to a lower level of said conveyor belt means, which changes the spacing of the food items relative to the spray means, said conveyor belt means returning to substantially said first level after each said at least one dip.

* * * * *